(12) United States Patent
Stoller et al.

(10) Patent No.: US 8,000,899 B2
(45) Date of Patent: Aug. 16, 2011

(54) BOREHOLE INVARIANT POROSITY MEASUREMENT METHOD

(75) Inventors: Christian Stoller, Princeton Junction, NJ (US); Françoise Allioli, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 283 days.

(21) Appl. No.: 11/340,054

(22) Filed: Jan. 26, 2006

(65) Prior Publication Data

US 2007/0057171 A1    Mar. 15, 2007

(30) Foreign Application Priority Data

Jan. 31, 2005   (EP) ..................... 05290213

(51) Int. Cl.
  *G01V 5/10*    (2006.01)
(52) U.S. Cl. ....................... 702/8; 250/269.4
(58) Field of Classification Search .................. 702/6–8, 702/85; 73/152.05; 250/269.1–269.7
  See application file for complete search history.

(56) References Cited

U.S. PATENT DOCUMENTS

| | | | |
|---|---|---|---|
| 4,423,323 A | 12/1983 | Ellis et al. | |
| 5,250,806 A * | 10/1993 | Rhein-Knudsen et al. | ... 250/254 |
| 5,357,797 A * | 10/1994 | Maki et al. | ................. 73/152.05 |
| 5,451,779 A * | 9/1995 | Spross et al. | .................. 250/266 |
| 5,473,158 A * | 12/1995 | Holenka et al. | ............... 250/254 |
| 5,767,510 A | 6/1998 | Evans et al. | |
| 6,272,434 B1 * | 8/2001 | Wisler et al. | ..................... 702/9 |
| 6,768,106 B2 * | 7/2004 | Gzara et al. | ................ 250/269.3 |
| 6,918,293 B2 * | 7/2005 | Moake et al. | ............. 73/152.05 |
| 7,112,783 B2 * | 9/2006 | Ellis et al. | .................. 250/269.4 |
| 2002/0190198 A1 | 12/2002 | Mickael | |

FOREIGN PATENT DOCUMENTS

EP    0519675    12/1992

* cited by examiner

*Primary Examiner* — Manuel L Barbee

(57) ABSTRACT

The invention concerns a method for determining the porosity of an earth formation penetrated by a borehole. The method comprises conveying a tool along said borehole, wherein the tool comprises a source of neutron radiation and at least two detectors axially spaced from said source at at least two different spacings. At least one near detector and at least one far detector are selected and a correction computed. The porosity of the earth formation is determined by correcting the far detector porosity with the computed correction.

17 Claims, 3 Drawing Sheets

BOREHOLE INVARIANT POROSITY MEASUREMENT METHOD

CROSS REFERENCE TO RELATED APPLICATIONS

This application claims priority to European patent application 05290213.7 filed Jan. 31, 2005.

BACKGROUND OF THE INVENTION

1. Field of the Invention

This invention relates to a method for determining the porosity of earth formations penetrated by a borehole. More specifically, the invention relates to a method whereby inaccuracies in the determination of the porosity as a result of standoff from the borehole wall may be substantially eliminated.

2. Description of the Related Art

In hydrocarbon exploration and production, it is of prime importance to determine (a) if a given earth formation contains hydrocarbon, (b) the amount of hydrocarbon within the formation, and (c) the producibility of the hydrocarbon in place within the formation. The amount of hydrocarbon present within a formation is a function of the pore space or the "porosity" of the formation. In drilling wells for the production of hydrocarbon, and even after those wells have been drilled, it is desirable to measure the porosity of each prospective hydrocarbon producing formation penetrated by the borehole. It is even more desirable, for economic and operational reasons well known in the art, to determine the porosity of prospective formations during the actual drilling of the borehole.

Porosity measurements are generally performed by a dual-detector neutron porosity logging tool provided with a neutron emitting source that irradiates the formation under study. The tool is typically urged against one side of the borehole wall by tool eccentralizers. The resulting neutron population is sampled by at least two neutron detectors spaced at different distances from the source. A tool of this sort is described in detail in U.S. Pat. No. 3,483,376. If a two-detector measurement is made at a sufficient distance from the source, the effects of borehole size and tool standoff are minimized by taking the ratio of the counting rates. The ratio is, therefore, the measured parameter to compute porosity. Corrections are made to the porosity value computed from the ratio in order to improve accuracy. Although much smaller than for single detector systems, borehole diameter corrections for dual detectors systems are significant and can be quantified if the effective borehole diameter is known. Various borehole caliper devices were, and today still are, run in conjunction with dual detector neutron devices to provide a measure of borehole diameter from which a borehole size correction is computed and applied to porosity values computed from the ratio of detector responses.

Means for correcting dual detector neutron porosity devices, without using borehole diameter measurements from a caliper device, have been disclosed. U.S. Pat. No. 4,423,323 to Darwin V. Ellis and Charles Flaum, issued Dec. 27, 1983, describes a logging method for investigating the porosity of a sub-surface geological formation that includes the steps of:

passing a neutron logging tool through the borehole while irradiating the formation with neutrons;

detecting neutrons by a near and a far detector spaced from the source by different distances, generating signals indicative of the near and far detectors count rates;

comparing the logarithms of the count rates to an empirically or mathematically derived tool response to variations only in porosity with the aid of another empirically or mathematically derived tool response to variations only in standoff and/or borehole size; and generating a tangible representation of formation porosity corrected for the effects of standoff and/or borehole size from said comparison.

This algorithm is however relatively complex, and the range of borehole diameter variation over which reliable compensation can be obtained is relatively limited.

Measurement-while-drilling (MWD) services were introduced commercially in the 1970's. These systems were typically mounted within drill collars and positioned as close to the drill bit as possible. Early MWD systems were directed toward the measurement of critical drilling parameters such as weight and the torque on the drill bit and direction of the drilled borehole. The operational and commercial value of such measurements is well known in the art. Subsequently, systems, which measured formation characteristics were introduced. Since such measurements provide information similar to wireline logging measurements, they are commonly referred to as logging-while-drilling (LWD) systems. There are many advantages in measuring formation parameters while drilling the borehole, rather than after the borehole has been drilled. The operational, financial, and technical advantages of LWD are likewise well known in the art. Neutron porosity, formation density, natural gamma ray, and various formation resistivity measurements were precursors to the present suite of available LWD measurements.

The earliest neutron porosity LWD systems employed only a single detector, but a second detector was quickly added. As in their wireline counterparts, the response of LWD dual detector neutron porosity systems is affected by borehole diameter and by the radial position of the source-detector system within the borehole. It is obvious that mechanical, arm type borehole calipers, which are used in wireline operations, cannot be used in LWD operations due to the rotation of the drill bit. Likewise, it is more difficult to control the radial positioning, or eccentricity, of the drill collar containing the LWD system within the borehole since wireline type mechanical centralizers or eccentralizers are not practical on a rotating drill string.

Various methods have been used to estimate the borehole diameter and drill string eccentricity in the immediate vicinity of the neutron porosity device. Estimates can be obtained from the drill bit diameter, the drilling fluid pumping pressure, and the mechanical properties of the formation being penetrated. Formation mechanical properties are estimated from MWD measurements, such as torque and weight on the bit, combined with rate of penetration of the drill bit that is measured at the surface. This method, at best, provides only a rough estimate of borehole geometry in the vicinity of the drill bit since formation and drilling mechanical conditions can change rapidly.

Other methods have been employed in an attempt to reliably caliper the borehole without using a specifically dedicated LWD caliper system. Generally speaking, these methods combine data from a plurality of LWD devices that exhibit different sensitivities to borehole geometric parameters. Such additional LWD devices might include well-known scattered gamma ray density devices and resistivity devices, which respond to varying radial depths of the borehole and formation environs. Borehole information is extracted by combining responses of these devices, and borehole corrections are derived from these responses. Again, generally speaking, this method of calipering a borehole and correcting measurements for borehole effects is not reliable. In addition, a relatively complex suite of LWD devices must be employed in order to practice this method.

U.S. Pat. No. 5,175,429 to Hugh E. Hall. Jr. et al, issued Dec. 29, 1992, discloses a tool stand-off compensation method for nuclear logging-while-drilling measurements. No independent borehole caliper or any other subsystem is required to obtain the desired tool stand-off or borehole size compensation. Count rates from a plurality of nuclear detectors are sorted and stored in "bins" as a function of apparent instrument stand-off. Detector responses are examined as a function of energy level thereby requiring spectral recording capabilities in the borehole instrument. These required features greatly increase the complexity of the borehole instrument, increase the demands on the logging-while-drilling telemetry system, and necessitate a relatively complex interpretation algorithm.

Document U.S. Pat. No. 5,767,510 describes means modifying the ratio of near detector to far detector count rates. A function of the far detector count rate has been found that results in a near detector response and a modified far detector response that exhibit nearly identical apparent radial sensitivities over the normal operating range of the tool. The result is a "modified" ratio of near detector count rate to modified far detector count rate that varies with formation, but that is essentially insensitive to radial perturbations such as variations in borehole diameter, variations in borehole shape, and variations in tool standoff.

An object of the present invention is to provide a borehole invariant neutron porosity measurement over a range of borehole diameters in which most dual detector neutron porosity devices are designed to operate. Another object is to provide a borehole invariant neutron porosity system that requires minimum data transmission and storage capacity. There are other objects and advantages of the present invention that will become apparent in the following disclosure.

SUMMARY OF THE INVENTION

The present invention is directed toward providing a borehole invariant porosity measurement using only the responses of at least two detectors positioned at different, preferably aligned, spacings from a source of nuclear radiation that emits typically fast neutrons.

Historically, the perturbing effects of borehole size, borehole shape, and the radial position of the instrument within the borehole can be overcome, at least to first order, by computing porosity from a simple ratio of the detector responses. This ratio has been formed from the response of the detector closest to the source, or the "near" detector, divided by the response of the detector farthest from the source, or the "far" detector. This procedure does not, however, provide complete borehole compensation and the resulting partially corrected porosity must be corrected for borehole size, borehole shape, and the position of the instrument within the borehole. The distance of the instrument from the borehole wall at the azimuthal location of the neutron detectors is generally referred to as the "standoff" of the instrument from the borehole wall.

The present invention provides means for greatly improving compensation for borehole effects. Therefore, the invention proposes a method for determining the porosity of earth formation penetrated by a borehole, the method comprising:

conveying a tool along said borehole, wherein said tool comprises a source of neutron radiation and at least two detectors axially spaced from said source at two different spacings;

generating detector responses for each said at least two detectors which are indicative of neutron radiation from said source interacting with said formation;

selecting from said at least two detectors a set of detectors comprising at least one near detector and at least one far detector;

using said near detector response and said far detector response in order to obtain a near apparent porosity and a far apparent porosity and/or an apparent porosity based on the ratio of the near and far detector responses;

computing a correction factor, said correction being obtained from a function comprising:

the difference between said near apparent porosity and said far apparent porosity or the difference between said near apparent porosity and said near/far ratio apparent porosity; and coefficients that have been determined from responses of the tool for a known formation porosity, a known tool standoff from the borehole wall and a known borehole size; and determining the porosity of the earth formation by correcting with the correction factor either the far or the near/far ratio porosity, depending on if the far porosity or the near/far ratio porosity has been respectively retained in the computation of said correction factor.

The method of the invention is thus particularly efficient since the correction factor is obtained from simple calculations and stored coefficients.

The invention is preferably embodied in a LWD system but provides equally effective borehole compensation in wireline systems.

In one embodiment, the computed correction factor is obtained from a mathematical function of the form $\Delta\Phi_{computed} = d_1 \times (\phi_{far} - \Phi_{near}) \times (\Phi_{far} - d_2)^2$, wherein $\Delta\Phi_{computed}$ is the computed correction factor, $\Phi_{far}$ and $\Phi_{near}$ are respectively the far and near apparent porosities, $d_1$ and $d_2$ are coefficients that have been determined by empirical response of the tool for a known formation porosity and a known tool standoff from the borehole wall.

In another embodiment, the computed correction factor is obtained from a mathematical function of the form $$\Delta\Phi_{computed} = d_1 \times (\Phi_{near/far} - \Phi_{near})^2$$

wherein $\Delta\Phi_{computed}$ is the computed correction factor $\Phi_{near/far}$ and $\Phi_{near}$ are respectively the near/far ratio and near apparent porosities $d_1$ is a coefficient that has been determined from modeled and measured responses of the tool for a known formation porosity, a known tool standoff from the borehole wall and a known borehole size.

In a third preferred embodiment, the computed correction factor is obtained from a mathematical function of the form:

$$\Delta\Phi_{computed} = a_{N/F} \cdot (\Phi_{N/F-apparent} - \Phi_{near})$$

wherein $\Delta\Phi_{computed}$ is the computed correction factor $\Phi_{N/F-apparent}$ and $\Phi_{near}$ are respectively the near/far ratio apparent porosity and near apparent porosity $a_{N/F}$ is a function that has been determined from the response of the tool for a known formation porosity and a known tool standoff from the borehole wall.

Preferably, the function $a_{N/F}$ is of the form:

$$a_{N/F} = f(N/F) = a_o \cdot h(a_1 \cdot (N/F - a_2)) + a_3$$

wherein $a_o$, $a_1$, $a_2$ and $a_3$ are coefficients from modeled and/or measured responses of the tool for a known formation porosity, a known tool standoff from the borehole wall and a known borehole size.

The source of fast neutrons is preferably a neutron generator producing high energy neutrons through the d-T reaction. Alternatively, an isotopic chemical source such as Americium-Beryllium (AmBe) or Californium-252 ($^{252}$Cf) can be used. Also the generator could produce neutrons through a different reaction like d-D. Preferably, two axially spaced neutron detectors are employed. Neutron detectors are preferably thermal neutron detectors. Alternatively, epithermal neutron detectors can be employed. In another embodiment both epithermal and thermal neutron detectors are used. As a further alternative, gamma ray detectors can be used to detect gamma radiation resulting from primarily thermal neutron capture and fast neutron inelastic scattering in the borehole environs. The embodiment using a neutron generator and thermal neutron detectors is preferred.

In an alternate embodiment, more than two axially spaced detectors can be employed. At each axial spacing, there can be multiple detectors. The response of can be computed from pairs of detectors positioned at the same azimuth. Alternatively, the response of the detectors at one spacing can be summed, as if only one detector were present at said spacing. In the second approach the azimuthal spread between the two detectors should be small compared to the azimuthal resolution of the response. If there are detectors at more than two axial spacings then the response at the two spacings, which are best suited for the porosity determination in a given environment, is selected.

Using an LWD neutron porosity subassembly with a diameter of 6.5 in. (inches), it has been found that a borehole invariant porosity measurement can be obtained for fresh water filled boreholes ranging in diameter from approximately 8 in. to 14 in.

The advantages of the current invention are numerous. No additional LWD or wireline subsystem is required to independently caliper the borehole. This minimizes the manufacturing cost and complexity of the borehole instrument, and thereby increases reliability and decreases lost time and maintenance costs. The algorithm used to convert detector count rate to borehole invariant porosity is very simple. Should borehole conditions, or formation conditions, or drilling fluid parameters change such that the modified ratio is no longer borehole invariant, then the functional form of the correction can be easily adjusted.

BRIEF DESCRIPTION OF THE DRAWINGS

For a more detailed description of the preferred embodiment of the present invention, reference will now be made to the accompanying drawings, wherein.

DETAILED DESCRIPTION OF THE INVENTION

Figure 1:
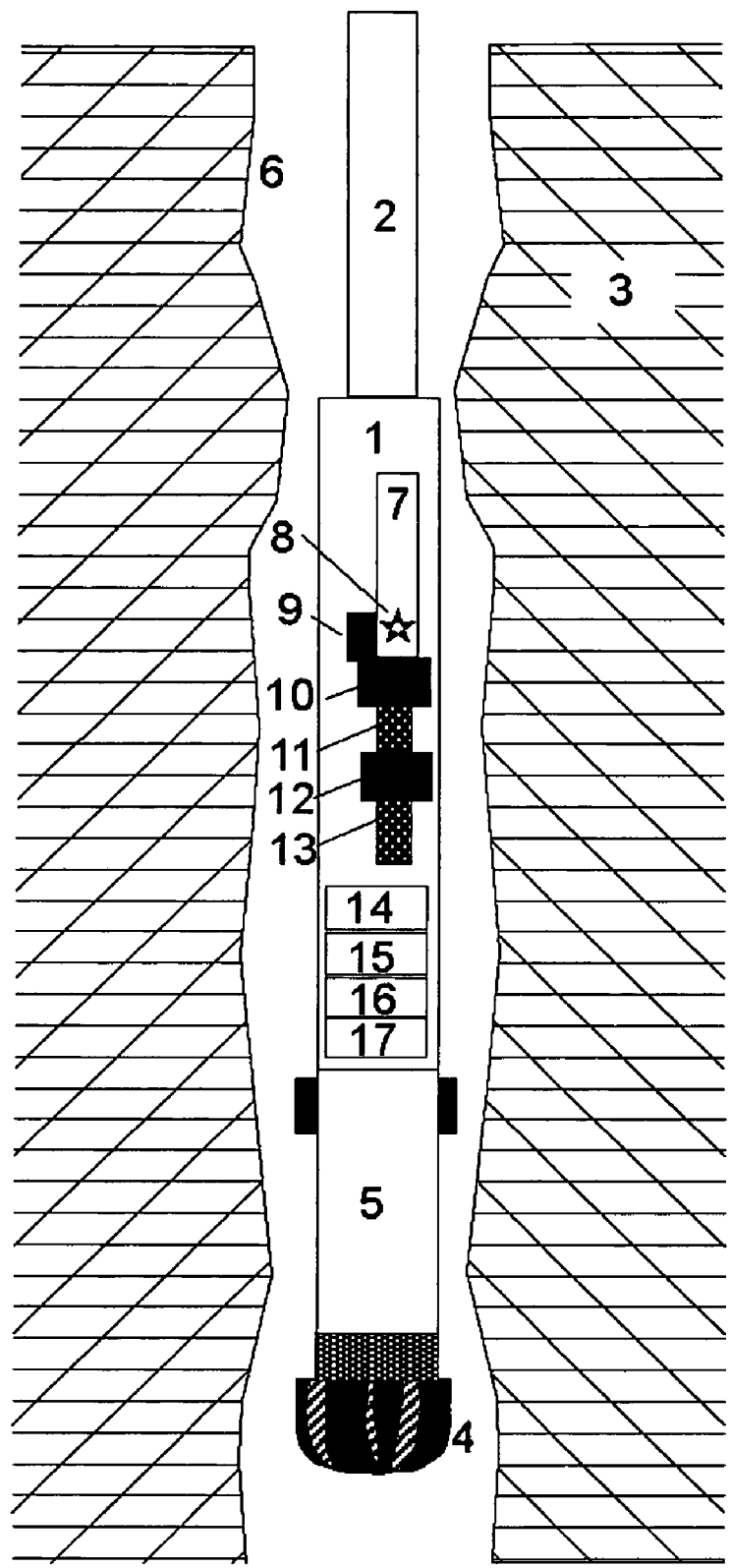
FIG. 1 represents an example of an apparatus for performing the method according to the invention.

A possible embodiment of a practical apparatus placed in a borehole 6, traversing an earth formation 3 is shown in FIG. 1. The borehole logging tool 1 consists of a pressure housing conveyed in a borehole 6 as part of the drill string 2. The logging tool 1 contains two neutron detectors or two banks of one or more neutron detectors at two different axial spacings from the neutron source. These detectors are referred to as the near detector 11 and the far detector 13. In the preferred embodiment the neutron source is a neutron generator 7 producing 14 MeV fast neutrons through the d-T nuclear reaction in the target 8. The generator is equipped with a monitor detector 9, which serves as the reference for the neutron output of the generator. The preferred detectors are $^3$He thermal neutron detectors. Since the neutron flux at the far detector location is generally much lower than at the near detector location the far detector may have a larger volume or multiple far detectors may be used.

The near and far detectors are shielded from the direct flux of neutrons from the neutron source by neutron shields placed axially between the neutron source and the near detector (shield 10) and between the near and the far detector (shield 12). Additionally, the detectors may be shielded in such a way as to make them preferentially sensitive to the neutron flux coming from a preferred azimuthal direction (not shown).

The near and far detectors count the neutrons reacting in the detector volume with the $^3$He gas in the detector. The count rate in each detector provides a measurement of the neutron flux at the detector. Each neutron reaction in the detector results in an electrical pulse from the detector. This pulse is further amplified in a preamplifier. The pulse is then sent to the main amplifier 14. The output pulse from the main amplifier is connected to a discriminator circuit 15, which generates a digital pulse. The pulses are counted in a counting circuit. The total counts and the time over which the counts were accumulated are used to calculate the count rate in the processor 16. The data are stored as a function of time in the tool memory 17 and some or all of the data are sent uphole through borehole telemetry.

Figure 2:
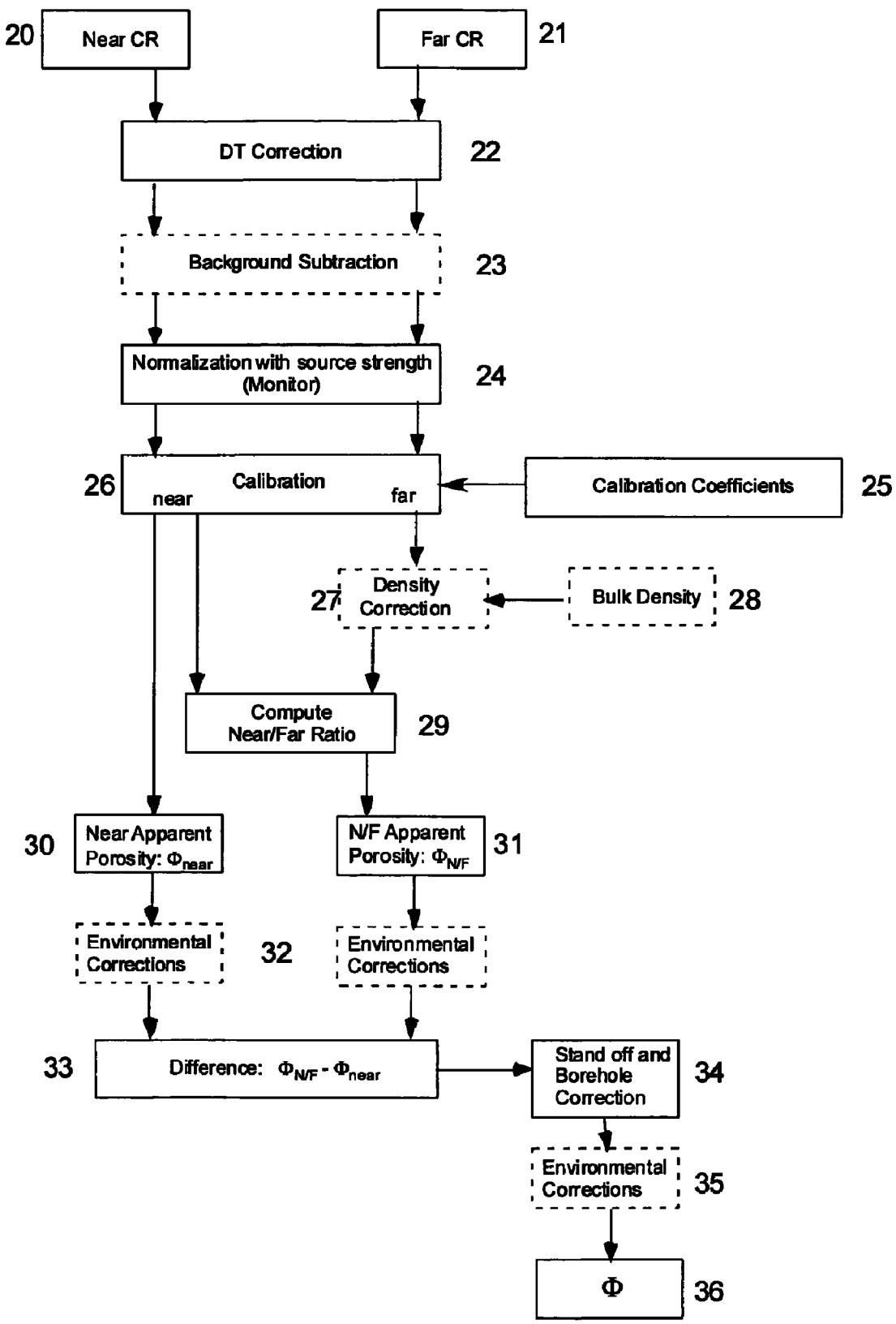
FIG. 2 represents a schematic workflow diagram of the method according to the invention.

The porosity is then computed from the near and far detector count rates as indicated by references 20 and 21 in FIG. 2. First the count rates are corrected for deadtime at 22. If the detectors are equipped with a check source, or if gamma-ray detectors are used, the background, which is not associated with the neutron signal is subtracted at 23. Since the neutron output of the generator may vary over time and with changing tool temperature, the counts must be normalized to the neutron output of the generator. This can be done by normalizing 24 all the count rates by the monitor count rate acquired during the same time interval. This step is not necessary if a chemical neutron source is used.

Since there are small variations from tool to tool, the count rates need to be referenced to calibrated values from a calibration in a well-defined environment. The calibration coefficients 25 are determined at regular intervals or after tool repairs to assure an accurate tool response. The count rates after step 24 are corrected 26 using the calibration coefficients.

After this the far detector count rates may be corrected by a factor which depends on the bulk density of the surrounding formation. This density 28 can be determined by an independent density measurement e.g. through gamma-ray scattering or it can be determined through additional measurements using the gamma-rays generated by the neutrons from the same neutron source (Pulsed neutron density as been for example described in U.S. Pat. No. 5,804,820 incorporated herein by reference). At this point the ratio of the near and far count rates is determined at 29 and two apparent porosities are computed by transforming the near count rate into a near apparent porosity 30 and the near/far ratio similarly into a near/far apparent porosity 32. Alternatively a far detector apparent porosity can be determined as well. If the tool is in perfect contact with the formation and the detectors are at their closest point to the formation, the two porosities are the same (within the statistical error of the measurement). A difference between the two porosities is an indication that the tool is not in perfect contact and/or that the detectors are not pointing to the formation. The difference between the near/far and the near porosities 33 is a measure of the error of the apparent porosities compared to the true porosity. The true porosity 36 can now be determined by adding a correction 34 to the apparent near/far porosity.

Experiments and nuclear modeling have shown that the error between the two porosities is directly related to the difference between the true porosity and the N/F ratio porosity and that the errors due to standoff and due to varying borehole size result in the same correction curve. This makes the correction independent of the borehole size.

Such a correction can be computed through the following formula:

$$\Delta\Phi_{computed} = d_1 \times (\Phi_{far} - \Phi_{near}) \times (\Phi_{far} - d_2)^2$$

wherein $\Delta\Phi_{computed}$ is the computed correction factor $\Phi_{far}$ and $\Phi_{near}$ are respectively the far and near apparent porosities $d_1$ and $d_2$ are coefficients that have been determined by response of the tool for a known formation porosity and a known tool standoff from the borehole wall.

Other formula that provides satisfying results is of the form:

$$\Delta\Phi_{computed} = d_1 \times (\Phi_{near/far} - \Phi_{near})^2$$

wherein $\Delta\Phi_{computed}$ is the computed correction factor $\Phi_{near/far}$ and $\Phi_{near}$ are respectively the near/far ratio and near apparent porosities $d_1$ is a coefficient that has been determined by from modeled and measured responses of the tool for a known formation porosity, a known tool standoff from the borehole wall and a known borehole size.

Neutron transport and in particular thermal neutron transport is affected by environmental conditions like temperature, pressure, borehole fluid hydrogen index, neutron absorption in borehole and formation, lithology etc. These effects need to be corrected at various stages in the computation (32, 35).

Figure 3:
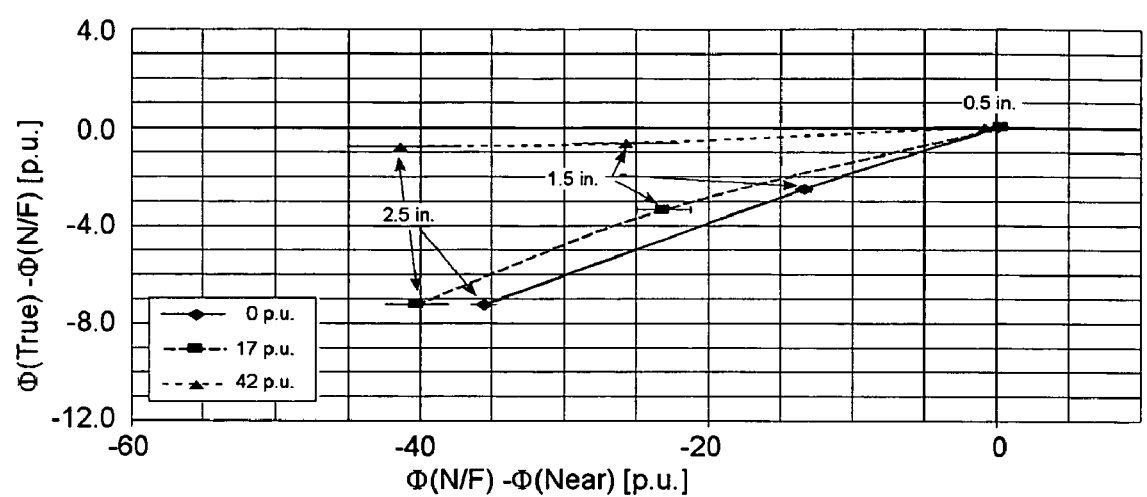
FIG. 3 describes a plot of the correction that can be obtained using the method of the invention.

FIG. 3 shows a typical plot of the correction that can be obtained using this procedure. The figure comprises data taken in boreholes with diameters ranging from 8 to 12 in. and with varying standoffs from the borehole wall at three different formation porosities.

The horizontal axis shows the difference between the near/far (N/F) and the near porosity. The vertical axis shows the difference between the N/F apparent porosity and the true porosity for the case of a 0 pu formation. In this case the correction $\Delta\Phi_{computed}$ can be described as a linear function of the difference between the two porosities: $\Delta\Phi_{computed} = a_{N/F} \cdot (\Phi_{N/F-apparent} - \Phi_{near})$ The slope of the curve $a_{N/F}$ is a function of the apparent near/far ratio porosity. This can be seen in FIG. 3, which shows the required correction for a 0, 17 and 42 pu formation. It is evident that the required correction becomes smaller with increasing porosity. At a porosity of about 40 pu the correction vanishes.

The coefficient $a_{101}$ can be written as $$a_{N/F} = g(\Phi_{N/F-apparent}) = f(N/F) = a_o \cdot \tan h(a_1 \cdot (N/F - a_2)) + a_3$$

This functional form will be different for different tool geometries and will need to be derived for each specific case. The function can be expressed either in terms of an apparent porosity $a_{N/F} = g(\Phi_{N/F-apparent})$ or directly as a function of the near/far count rate ratio $a_{N/F} = f(N/F)$ as indicated in the equation above. It is possible that in some cases a first order correction for the borehole size will be needed to obtain a more accurate result.

Therefore, depending on tool specifications and characteristics determined during calibration step, the most appropriate correction function for the true porosity will be determined.

While the preceding description has shown a specific implementation of a dual detector compensated neutron tool for LWD using a generator and thermal neutrons the invention is not limited to this implementation. A similar tool could be used in wireline applications and the invention could be applied to tools using epithermal neutron detectors. The density correction applied to the far detector count rates may not be necessary in some cases. Alternatively there may be cases in which a density correction to the near detector is needed.

While the present invention relies on a porosity based on the near/far ratio of count rates it is possible to use a porosity based on the far count rate instead of the near/far ratio based porosity. It is also possible to base the correction on the near and far porosities and to apply the correction to the near/far ratio porosity.

The invention claimed is:

1. A method for determining a corrected porosity of earth formation penetrated by a borehole, the method comprising:
   conveying a tool along said borehole, wherein said tool comprises a source of neutron radiation and at least a near and a far detector axially spaced from said source at different spacings;
   generating detector responses for each said detectors indicative of neutron radiation from said source interacting with said formation;
   transforming said near detector response and said far detector response into at least a first and a second apparent porosity;
   computing a correction factor that is a function of a difference between said first and the second apparent porosity and a known tool standoff from the borehole wall; and
   determining the corrected porosity of the earth formation by applying the correction factor to at least one of the first and the second apparent porosity,
   wherein the computed correction factor is obtained from a function of the form:

$$\Delta\Phi_{computed} = d_1 \times (\Phi_{far} - \Phi_{near}) \times (\Phi_{far} - d_2)^2$$

where $\Delta\Phi_{computed}$ is the computed correction factor, $\Phi_{far}$ and $\Phi_{near}$ are respectively the far and near apparent porosities, and $d_1$ and $d_2$ are coefficients that have been determined by response of the tool for a known formation porosity and a known tool standoff from the borehole wall,
   wherein the transforming, computing and determining steps are performed by a processor.

2. The method of claim 1, where the far detector count rate is adjusted as a function of the formation bulk density before obtaining the far apparent porosity.

3. The method of claim 1, wherein the source of neutron radiation is a chemical source.

4. The method of claim 1, wherein the source of neutron radiation is a neutron generator that produces fast neutrons.

5. The method of claim 1, wherein the detectors are epithermal neutron detectors.

6. The method of claim 1, wherein the detectors are thermal neutron detectors.

7. The method of claim 1, wherein the tool includes both epithermal detectors and thermal neutron detectors.

8. The method of claim 1, wherein the detectors are gamma-ray detectors.

9. The method of claim 1, wherein multiple detectors are arranged in a group at each axial spacing.

10. The method according to claim 9, wherein the detector responses are generated from pairs of detectors positioned at the same azimuth.

11. The method of claim 9, wherein the detector responses are generated from the sum of the detectors response at one spacing, as if only one detector were present at said spacing.

12. The method of claim 1, wherein the tool is conveyed by means of a drill string.

13. The method of claim 1, wherein the porosity of earth formation is determined while the borehole is being drilled, said borehole being filled with a borehole fluid.

14. A method for determining a corrected porosity of earth formation penetrated by a borehole, the method comprising:
conveying a tool along said borehole, wherein said tool comprises a source of neutron radiation and at least a near and a far detector axially spaced from said source at different spacings;
generating detector responses for each said detectors indicative of neutron radiation from said source interacting with said formation;
transforming said near detector response and said far detector response into at least a first and a second apparent porosity;
computing a correction factor that is a function of a difference between said first and the second apparent porosity and a known tool standoff from the borehole wall; and
determining the corrected porosity of the earth formation by applying the correction factor to at least one of the first and the second apparent porosity,
wherein the computed correction factor is obtained from a mathematical function of the form:

$$\Delta\Phi_{computed} = d_1 \times (\Phi_{near/far} - \Phi_{near})^2$$

where $\Delta\Phi_{computed}$ is the computed correction factor, $\Phi_{near/far}$ and $\Phi_{near}$ are respectively the near/far ratio near apparent porosities, and $d_1$ is a coefficient that has been determined from modeled and measured responses of the tool for a known formation porosity, a known tool standoff from the borehole wall and a known borehole size,
wherein the transforming, computing and determining steps are performed by a processor.

15. A method for determining a corrected porosity of earth formation penetrated by a borehole, the method comprising:
conveying a tool along said borehole, wherein said tool comprises a source of neutron radiation and at least a near and a far detector axially spaced from said source at different spacings;
generating detector responses for each said detectors indicative of neutron radiation from said source interacting with said formation;
transforming said near detector response and said far detector response into at least a first and a second apparent porosity;
computing a correction factor that is a function of a difference between said first and the second apparent porosity and a known tool standoff from the borehole wall; and
determining the corrected porosity of the earth formation by applying the correction factor to at least one of the first and the second apparent porosity,
wherein the computed correction factor is obtained from a function of the form:

$$\Delta\Phi_{computed} = a_{N/F} \cdot (\Phi_{N/F-apparent} - \Phi_{near})$$

where $\Delta\Phi_{computed}$ is the computed correction factor, $\Phi_{N/F-apparent}$ and $\Phi_{near}$ are respectively the near/far ratio apparent porosity and near apparent porosity, and $a_{N/F}$ is a function that has been determined from the response of the tool for a known formation porosity and a known tool standoff from the borehole wall,
wherein the transforming, computing and determining steps are performed by a processor.

16. A method for determining a corrected porosity of earth formation penetrated by a borehole, the method comprising:
conveying a tool along said borehole, wherein said tool comprises a source of neutron radiation and at least a near and a far detector axially spaced from said source at different spacings;
generating detector responses for each said detectors indicative of neutron radiation from said source interacting with said formation;
transforming said near detector response and said far detector response into at least a first and a second apparent porosity;
computing a correction factor that is a function of a difference between said first and the second apparent porosity and a known tool standoff from the borehole wall; and
determining the corrected porosity of the earth formation by applying the correction factor to at least one of the first and the second apparent porosity,
wherein the first apparent porosity is a near apparent porosity based on the near detector response and the second apparent porosity is a far apparent porosity based on the far detector response,
wherein the correction factor is the function of the difference between the near apparent porosity and the far apparent porosity, and applying the correction factor to the far apparent porosity,
wherein the transforming, computing and determining steps are performed by a processor.

17. A method for determining a corrected porosity of earth formation penetrated by a borehole, the method comprising:
conveying a tool along said borehole, wherein said tool comprises a source of neutron radiation and at least a near and a far detector axially spaced from said source at different spacings;
generating detector responses for each said detectors indicative of neutron radiation from said source interacting with said formation;
transforming said near detector response and said far detector response into at least a first and a second apparent porosity;
computing a correction factor that is a function of a difference between said first and the second apparent porosity and a known tool standoff from the borehole wall; and
determining the corrected porosity of the earth formation by applying the correction factor to at least one of the first and the second apparent porosity,
wherein the first apparent porosity is a near apparent porosity based on the near detector response and the second apparent porosity is a near/far ratio apparent porosity based on a ratio of the near and far detector responses,
wherein the correction factor is the function of the difference between said near apparent porosity and said near/far ratio apparent porosity, and applying the correction factor to the near/far ratio apparent porosity,
wherein the transforming, computing and determining steps are performed by a processor.

* * * * *